US008612895B2

(12) United States Patent
Kim et al.

(10) Patent No.: US 8,612,895 B2
(45) Date of Patent: Dec. 17, 2013

(54) INSTANT MESSAGE COMMUNICATION FOR FILTERING COMMUNICATION ACCESS FOR A MOBILE TERMINAL AND CONTROLLING METHOD THEREOF

(75) Inventors: Myo Ha Kim, Seoul (KR); Ju Ha Hyun, Seoul (KR); Hu Ran Choi, Seoul (KR); Jong Yoon Ahn, Seoul (KR); Eun Young Park, Seoul (KR)

(73) Assignee: LG Electronics Inc., Seoul (KR)

( * ) Notice: Subject to any disclaimer, the term of this patent is extended or adjusted under 35 U.S.C. 154(b) by 223 days.

(21) Appl. No.: 12/856,194

(22) Filed: Aug. 13, 2010

(65) Prior Publication Data

US 2011/0185290 A1     Jul. 28, 2011

(30) Foreign Application Priority Data

Jan. 25, 2010  (KR) .................. 10-2010-0006432

(51) Int. Cl.
*G06F 15/16* (2006.01)
*G06F 3/01* (2006.01)

(52) U.S. Cl.
USPC .......................................................... 715/863

(58) Field of Classification Search
USPC .......................................................... 715/753
See application file for complete search history.

(56) References Cited

U.S. PATENT DOCUMENTS

| | | | |
|---|---|---|---|
| 6,968,179 B1 * | 11/2005 | De Vries ................. | 455/414.1 |
| 2004/0073643 A1 * | 4/2004 | Hayes et al. ............ | 709/223 |
| 2004/0203746 A1 * | 10/2004 | Knauerhase et al. .... | 455/432.1 |
| 2005/0114777 A1 * | 5/2005 | Szeto ...................... | 715/710 |
| 2005/0204005 A1 * | 9/2005 | Purcell et al. ........... | 709/206 |
| 2005/0207557 A1 * | 9/2005 | Dolan et al. ............. | 379/210.02 |
| 2008/0005325 A1 * | 1/2008 | Wynn et al. ............. | 709/225 |
| 2008/0130936 A1 * | 6/2008 | Lau et al. ................ | 381/370 |
| 2012/0066325 A1 * | 3/2012 | Heredia et al. ......... | 709/206 |
| 2012/0110087 A1 * | 5/2012 | Culver et al. ........... | 709/205 |

OTHER PUBLICATIONS

Instant Messaging with your Contacts, (http://web.archive.org/web/20090205203224/http://help.yahoo.com/tutorials/msweb/msw/msw_im4.html, 2/200.*
Block Communication, (http://forum. teamxbox.com/showthread.php?t=497973, 2007.*
IM Reference with Trillian, (Powerpoint presentation, 2006.*

* cited by examiner

*Primary Examiner* — Omar Abdul-Ali
*Assistant Examiner* — Haimei Jiang
(74) *Attorney, Agent, or Firm* — Birch, Stewart, Kolasch & Birch, LLP

(57) ABSTRACT

A mobile terminal and controlling method thereof are disclosed, which facilitates a terminal to be used in further consideration of user's convenience. The present invention includes if a user having a prescribed ID logs in to an instant message server, receiving and displaying a pre-registered buddy list from the instant message server, setting a communication block for a first buddy in the buddy list not to inform the first buddy that the ID user has logged in, setting a communication grant for a second buddy in the buddy list to inform the second buddy that the ID user has logged in, displaying a dialogue window for an instant message communication with the first buddy, and receiving/transmitting an instant message from/to the first buddy despite that the communication block has been set for the first buddy. Accordingly, even if a user does not set a communication grant or block per a buddy in a buddy list in advance, it is able to effectively prevent a request for initiating an instant message communication with the user from being made by an unwanted buddy. Once one buddy is communication-blocked, it is able to receive an instant message from the communication-blocked buddy even before the communication block is released.

20 Claims, 13 Drawing Sheets

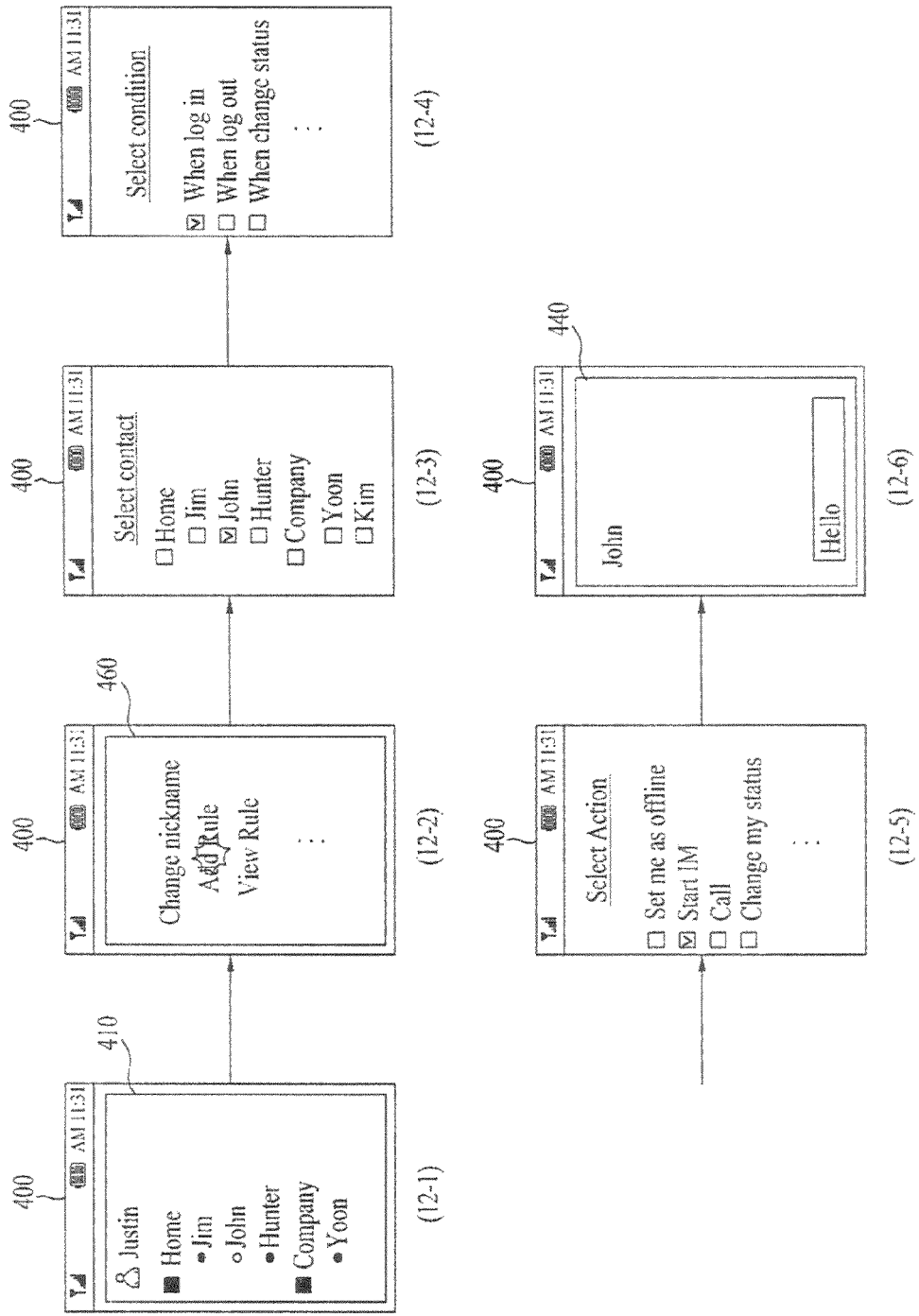

INSTANT MESSAGE COMMUNICATION FOR FILTERING COMMUNICATION ACCESS FOR A MOBILE TERMINAL AND CONTROLLING METHOD THEREOF

Pursuant to 35 U.S.C. §119(a), this application claims the benefit of earlier filing date and right of priority to Korean Application No. 10-2010-0006432, filed on Jan. 25, 2010, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, mobile terminals capable of performing instant message (IM) communication with a correspondent party are ongoing to be introduced. If a user logs in to an instant message server via a mobile terminal, the mobile terminal receives a list of chatting correspondent parties (buddies) registered in advance by the user from the instant message server and then displays the received list. Thus, the user is able to perform instant message communications with the buddies in the buddy list.

However, if the user logs in to the instant message server, login information indicating that the corresponding user has logged in can be delivered to the entire buddies in the buddy list. In particular, the login information may be unintentionally delivered to the buddy, with whom the user does not intend to perform the instant message communication, in the buddy list. Accordingly, the buddy having received the unintentionally delivered login information may make a request for initiation of the instant message communication with the user. And, the user may be embarrassed to decline the instant message communication initiation request made by the unwanted buddy. To prevent this happening, the user may set a communication access grant or a communication access block per buddy in the buddy list in advance, which however is inconvenient. Further, once the communication access block is set for a prescribed buddy, it is unable to receive any instant message from the communication-blocked buddy until the communication access block is released.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which a request for initiation of an instant message communication with a user from an unwanted buddy in a buddy list can be effectively prevented without setting a communication access grant or a communication access block per buddy in the buddy list in advance.

An object of the present invention is to provide a mobile terminal and controlling method thereof, by which if a communication access block is set for a prescribed buddy, an instant message can be received from the communication-blocked buddy despite that the communication access block is not released.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a display unit, a wireless communication unit for an instant message communication, and a controller, if a user having a prescribed ID logs in to an instant message server, controlling a pre-registered buddy list from the instant message server to be received and displayed from the instant message server, the controller controlling a communication block to be set for a first buddy in the buddy list not to inform the first buddy that the ID user has logged in, the controller controlling a communication grant to be set for a second buddy in the buddy list to inform the second buddy that the ID user has logged in, the controller controlling a dialogue window for the instant message communication with the first buddy to be displayed, the controller controlling an instant message to be received/transmitted from/to the first buddy despite that the communication block has been set for the first buddy.

In another aspect of the present invention, a method of controlling a mobile terminal according to the present invention includes, if a user having a prescribed ID logs in to an instant message server, receiving and displaying a pre-registered buddy list from the instant message server, setting a communication block for a first buddy in the buddy list not to inform the first buddy that the ID user has logged in, setting a communication grant for a second buddy in the buddy list to inform the second buddy that the ID user has logged in, displaying a dialogue window for an instant message communication with the first buddy, and receiving/transmitting an instant message from/to the first buddy despite that the communication block has been set for the first buddy.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 5 to 12 are diagrams for display screens on which a method of controlling a mobile terminal according to an embodiment of the present invention is implemented.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
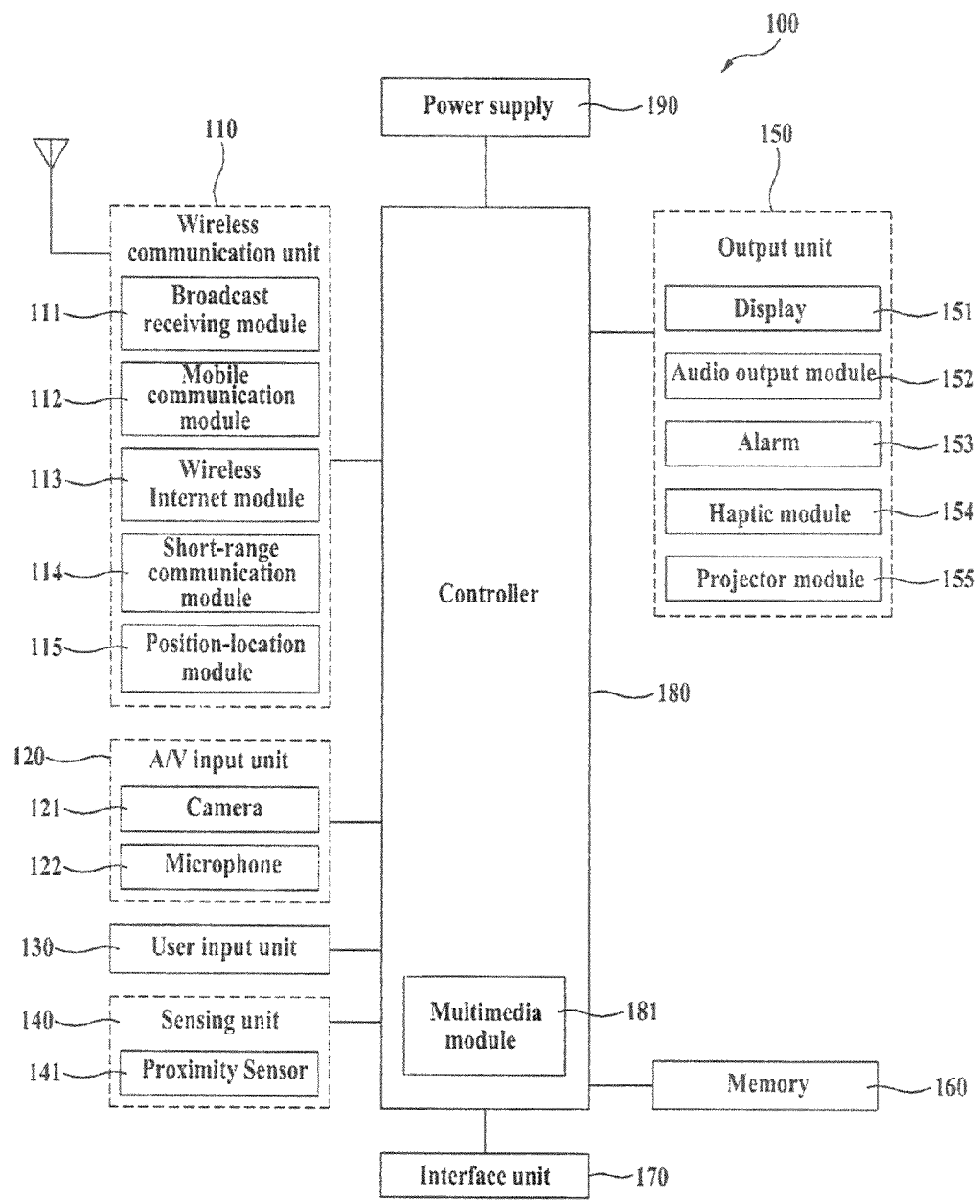
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal.

The sensing unit 140 can include at least one of a gravity sensor, a geomagnetic sensor and the like, by which the present invention is non-limited.

In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
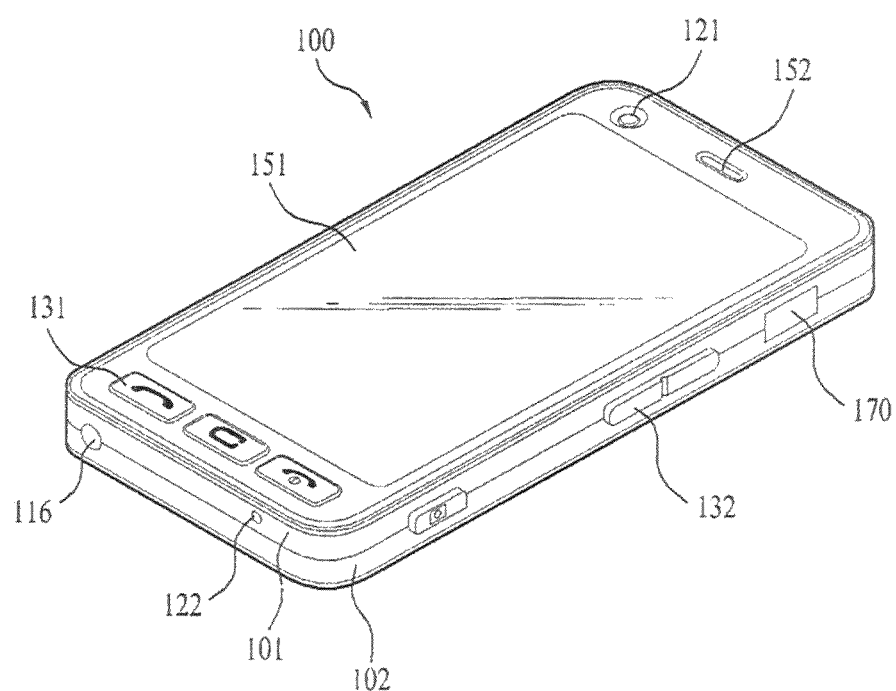
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
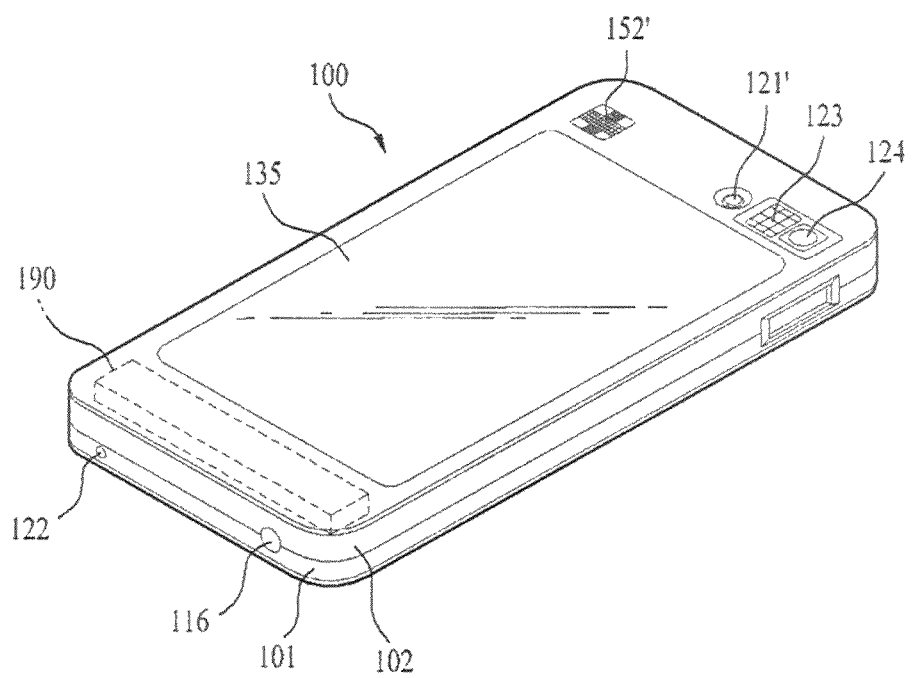
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

In the following description, embodiments related to a controlling method, which can be implemented in the mobile terminal 100, are explained with reference to the accompanying drawings.

The following description is made on the assumption that the display module 151 includes a touchscreen. And, a display screen of the touchscreen 151 is indicated by a reference number 400 in the following description.

Figure 3:
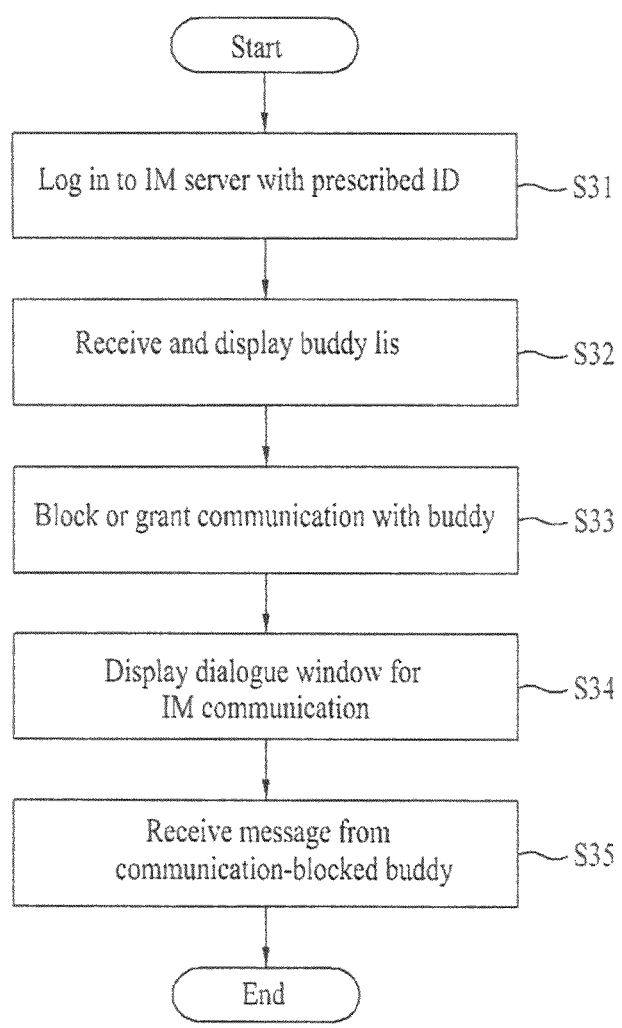
FIG. 3 is a flowchart for a method of controlling a mobile terminal according to an embodiment of the present invention.
Figure 4:
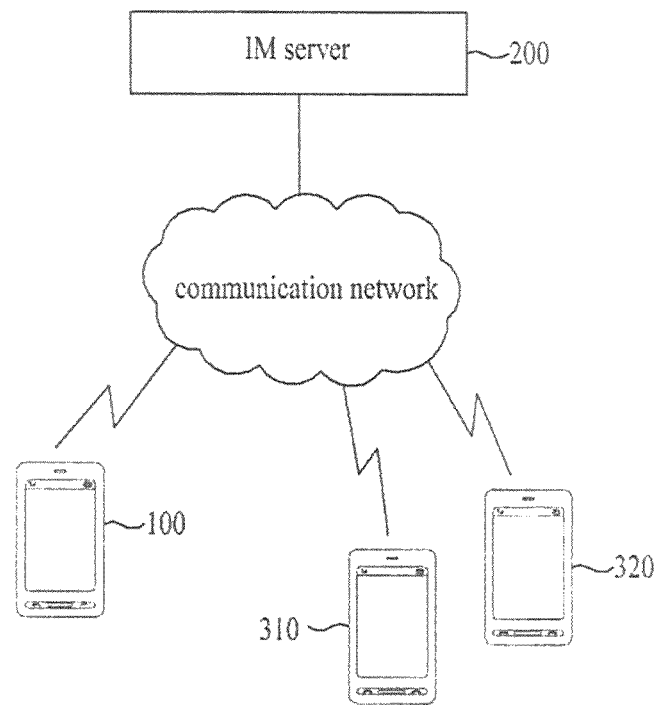
FIG. 4 is a schematic diagram of a wireless communication environment to which a controlling method implemented in the mobile terminal is applicable.

FIG. 3 is a flowchart for a method of controlling a mobile terminal according to an embodiment of the present invention. FIG. 4 is a schematic diagram of a wireless communication environment to which a controlling method implemented in the mobile terminal is applicable. And, FIGS. 5 to 12 are diagrams for display screens on which a method of controlling a mobile terminal according to an embodiment of the present invention is implemented.

Referring to FIG. 4, the mobile terminal 100 accesses a mobile communication network or a wireless internet network via the wireless communication unit 110 and is then able to log in to an instant message server 200. If so, instant message communications with counterpart terminals 310 and 320 logged in to the instant message server 200 are enabled.

The login of the mobile terminal 100 to the instant message server 200 is explained in detail with reference to FIG. 5 as follows.

Figure 5:
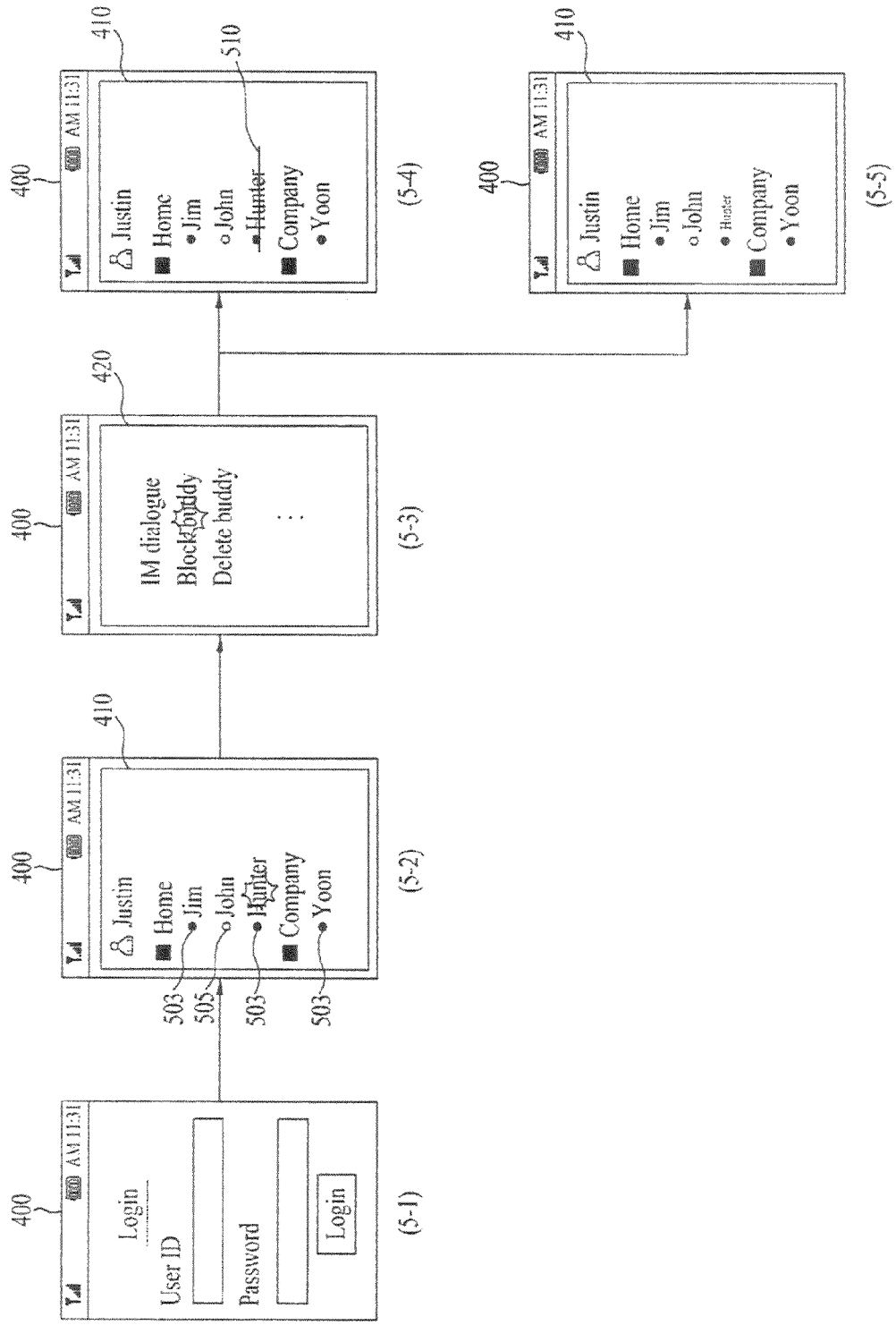

Referring to (5-1) of FIG. 5, if an instant message menu is entered through an appropriate manipulation of the user input unit 130 in the mobile terminal 100, a login picture for accessing the instant message server 200 is displayed on the touchscreen 400.

If a prescribed user ID and a password are inputted to the login picture, the mobile terminal 100 logs in to the instant message server 200 [S31].

If so, referring to (5-2) of FIG. 5, the mobile terminal 100 receives a buddy list 410, which was previously registered by the user of the inputted ID, from the instant message server 200 and then displays the received buddy list 410 [S32].

A nickname 'Justin' of the user ID is displayed in the buddy list 410 and other nicknames of pre-registered buddies are displayed per preset group (e.g., Home, Company, etc.).

Login indictors 503 and logoff indicators 505, which indicate whether or not the pre-registered buddies logged in to the instant message server 200, can be displayed to correspond to the nicknames of the buddies, respectively.

Referring to (5-3) of FIG. 5, if a prescribed buddy (e.g., Hunter) is selected from the buddy list 410, an instant message menu window 420 for the selected buddy is displayed on the touchscreen 400. For instance, the selection of the buddy can be performed in a manner of touching the corresponding nickname (e.g., Hunter).

In the menu window 420, exemplarily shown are menus including 'IM dialogue', 'buddy block', 'buddy delete' and the like, by which the present invention is non-limited.

If the menu 'IM dialogue' is selected from the menu window 420, an instant message communication with the buddy is initiated. If the menu 'buddy delete' is selected from the menu window 420, the corresponding buddy is deleted from the buddy list. This is apparent to those skilled in the art. And, its details shall be omitted from the following description for clarity. For instance, the selection of the menu can be performed in a manner of touching the corresponding menu in the menu window 420.

If the menu 'buddy block' is selected from the menu window 420, a communication block is set for the selected buddy (Hunter) [S33]. Therefore, in spite that the user (Justin) of the ID has logged in to the instant message server 200 via the mobile terminal 100, the user (Justin) of the ID seems to logged out in a terminal of the communication-blocked buddy (Hunter) [not shown in the drawing]. In particular, the communication blocked buddy (Hunter) is unable to check whether the user of the ID has logged in.

The communication blocked buddy in the buddy list 410 is displayable in a manner of being visually distinguished from other buddies (i.e., communication granted buddies) in the buddy list.

For instance, referring to (5-4) of FIG. 5, the communication blocked buddy can be visually distinguished from the communication granted buddy in a manner that a cancel line 510 is drawn on the nickname of the communication blocked buddy.

Alternatively, referring to (5-5) of FIG. 5, the communication blocked buddy can be visually distinguished from the communication granted buddy in a manner that a font of the nickname of the communication blocked buddy is displayed smaller than that of the communication granted buddy.

Figure 9:
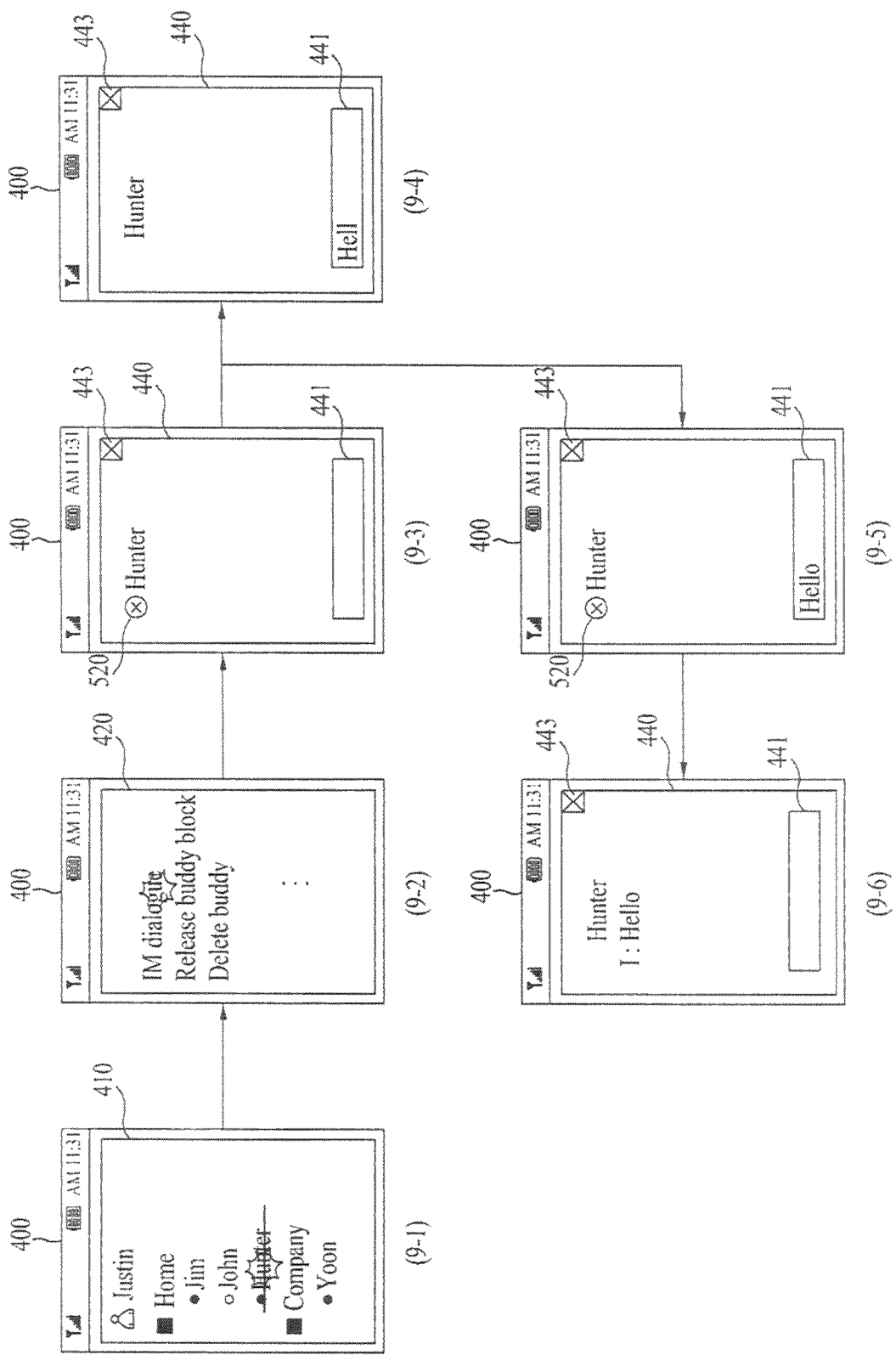

If the communication blocked buddy is re-selected, the menu window 420 can be displayed again [see (9-2) of FIG. 9]. In the re-displayed menu window 420, a menu 'buddy block release' can be displayed instead of the menu 'buddy block'. If the menu 'buddy block release' is selected, the communication block setting for the corresponding buddy can be restored into the communication grant setting [S33].

Displaying the communication blocked buddy and the communication granted buddy to be visually distinguished from each other is explained in detail with reference to FIG. 6 as follows.

Figure 6:
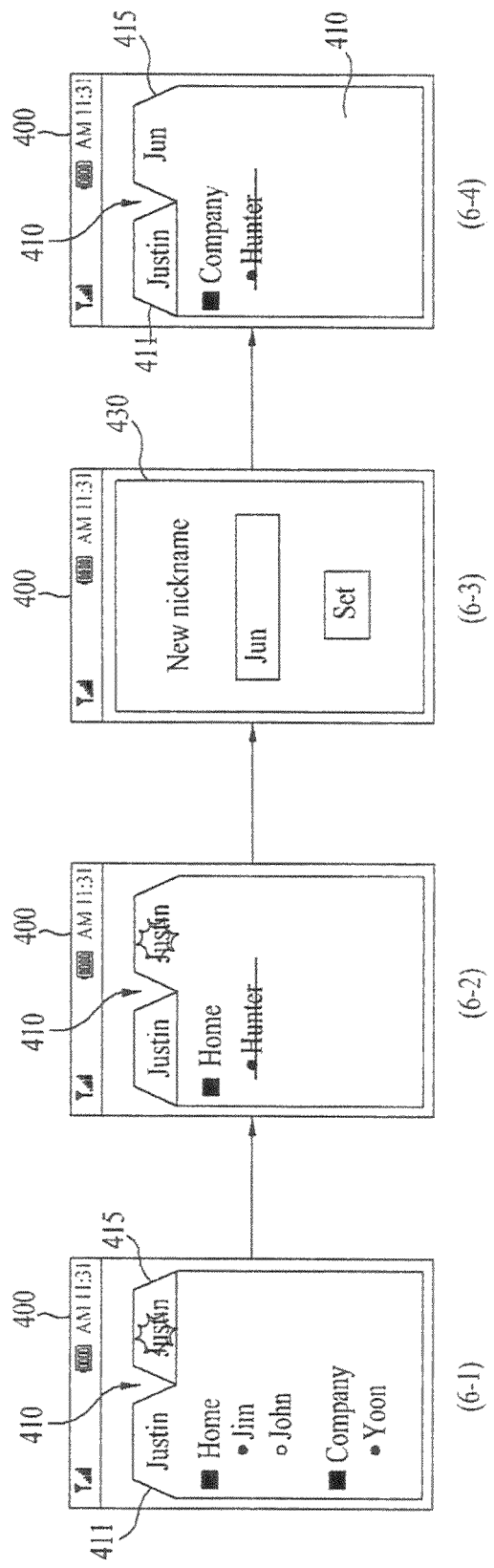

Referring to (6-1) of FIG. 6, two tabs for the buddy list 410, i.e., a first tab 411 and a second tab 415 can be further displayed on the touchscreen 400. In particular, buddies in the buddy list can be displayed by being grouped into the first tab 411 and the second tab 415. The first tab 411 is provided for the communication granted buddies, while the second tab 415 is provided for the communication blocked buddies.

In (6-1) of FIG. 6, exemplarily shown is that the first tab was already selected.

Therefore, referring to (6-1) of FIG. 6, the communication granted buddies are sorted out of the entire buddies in the buddy list 400 and can be then displayed on the touchscreen 400.

Subsequently, the second tab 415 is touched and selected.

If so, referring to (6-2) of FIG. 6, the communication blocked buddies are sorted out of the entire buddies in the buddy list 400 and can be then displayed on the touchscreen 400.

In (6-1) and (6-2) of FIG. 6, exemplarily shown are that the same nickname (Justin) of the user is provided in common to both of the communication granted buddies and the communication blocked buddies. Referring to (6-1) and (6-2) of FIG. 6, since the same nickname is displayed on each of the first and second tabs 411 and 415, it can be observed that the same nickname (Justin) is provided.

Furthermore, the present invention is able to provide different nicknames of the user to the communication granted buddies and the communication blocked buddies, respectively.

In the following description, how to set a nickname of the user for the buddies belonging for example to the second tab 415 is further explained.

Referring to (6-2) of FIG. 6, the second tab 415 is double-touched.

If so, referring to (6-3) of FIG. 6, a nickname setting window 430 can be displayed to set a new nickname of the user for the buddies belonging to the second tab 415.

If a new nickname (Jun) is set in the nickname setting window 430, the set new nickname can be displayed on the second tab 415.

Thus, the old nickname (Justin) is provided to the buddies belonging to the first tab 411 and the new nickname (Jun) can be provided to the buddies belonging to the second tab 415.

In the following description, how the instant message communication is initiated by one communication blocked buddy (e.g., Hunter) in the buddy list is explained in detail with reference to FIG. 7.

First of all, as mentioned in the foregoing description, since the buddy (Hunter) is communication-blocked, the log-off of the user of the ID is displayed on the terminal of the buddy.

Notwithstanding, the buddy is able to write and send an instant message to the ID user. The buddy may understand that the sent instant message would not be directly received by the ID user if the ID user has not logged in, or the sent instant message would be received by the ID user if the ID user has logged in but has set a communication block for the buddy.

Meanwhile, the instant message server receives the instant message from the communication blocked buddy and then forwards it to the mobile terminal 100.

Figure 7:
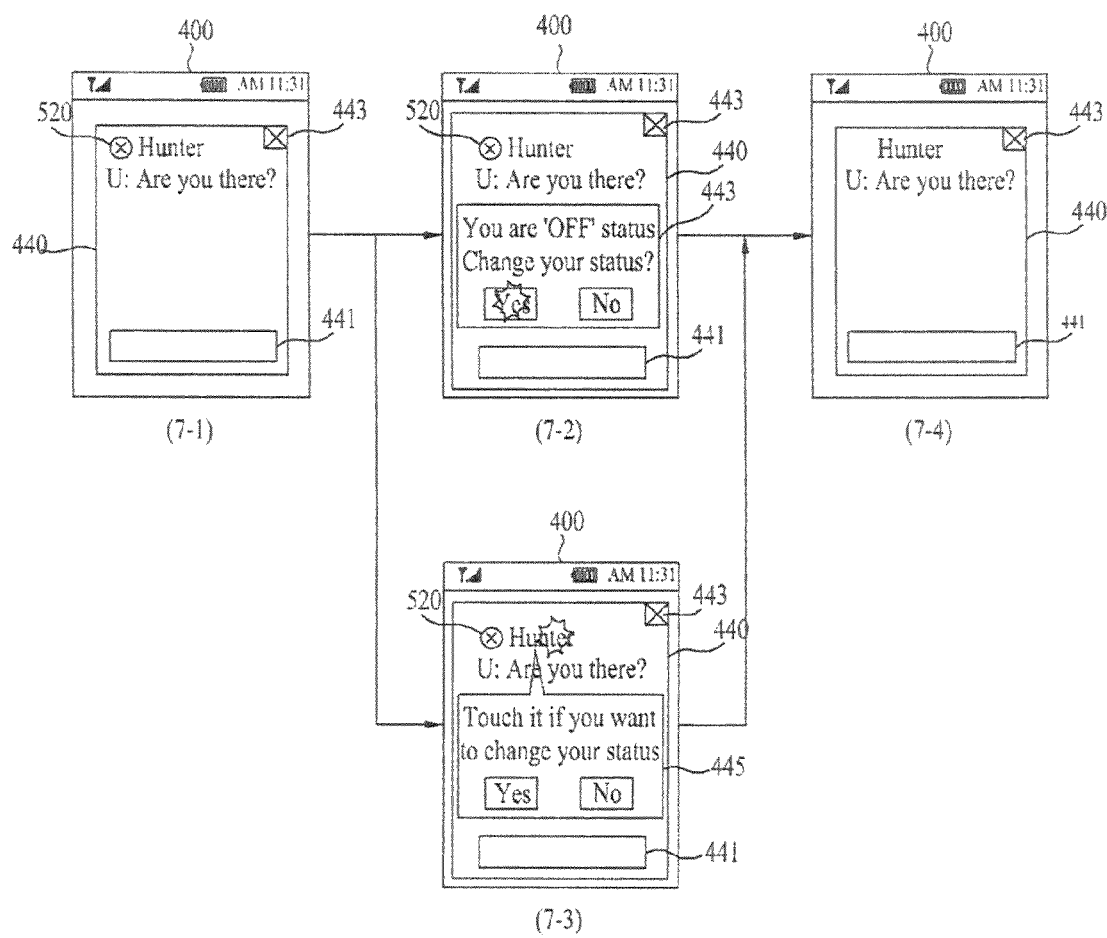

Referring to (7-1) of FIG. 7, the controller 180 of the mobile terminal 100 receives the instant message via the wireless communication unit 110 and generates a dialogue window 440 for the dialogue with the buddy on the touchscreen [S34].

Subsequently, the controller 180 displays the received instant message ('Are you there?') in the dialogue window 440 [S35].

The nickname (Hunter) of the buddy is displayed on the dialogue window 440. And, a communication block indicator 520 indicating that the buddy is communication-blocked is displayed next to the nickname.

Moreover, a text input box 441 for displaying a message inputted via the user input unit 130 and a window close icon 443 for closing the dialogue window 440 can be further displayed in the dialogue window 440.

Subsequently, referring to (7-2) of FIG. 7, on the touchscreen 400, a communication block setting change window 443 can be displayed. In this case, the communication block setting change window 443 indicates that the ID user is in a log-off status for the buddy since the buddy is communication-blocked. And, the communication block setting change window 443 is provided to query whether to change the log-off status of the ID user.

If an icon 'Yes' is selected from the communication block setting change window 443, the communication block setting of the buddy is changed into communication grant setting. Therefore, the communication block setting can be released.

If so, referring to (7-4) of FIG. 7, the communication block indicator 520 for the buddy disappears from the dialogue window 440. And, it would be shown on the terminal of the buddy that the ID user has logged in [not shown in the drawing].

Subsequently, the ID user is able to normally perform the instant message communication with the buddy via the dialogue window 440.

In (7-2) of FIG. 7, shown is that the communication block setting change window 443 for changing a status of the ID user is displayed, by which the present invention is non-limited. If the nickname (Hunter) of the buddy is simply touched, as shown in (7-3) of FIG. 7, on the dialogue window, the communication block setting of the buddy, as shown in (7-4) of FIG. 4, can be released.

In (7-3) of FIG. 7, exemplarily shown is that an announcement 445, which indicates that the status of the ID user for the buddy can be changed if the nickname of the buddy is touched, is displayed. Optionally, it is able to configure the announcement 445 not to be displayed.

Another method of changing a status of the ID user for the buddy is explained with reference to FIG. 8 as follows.

Figure 8:
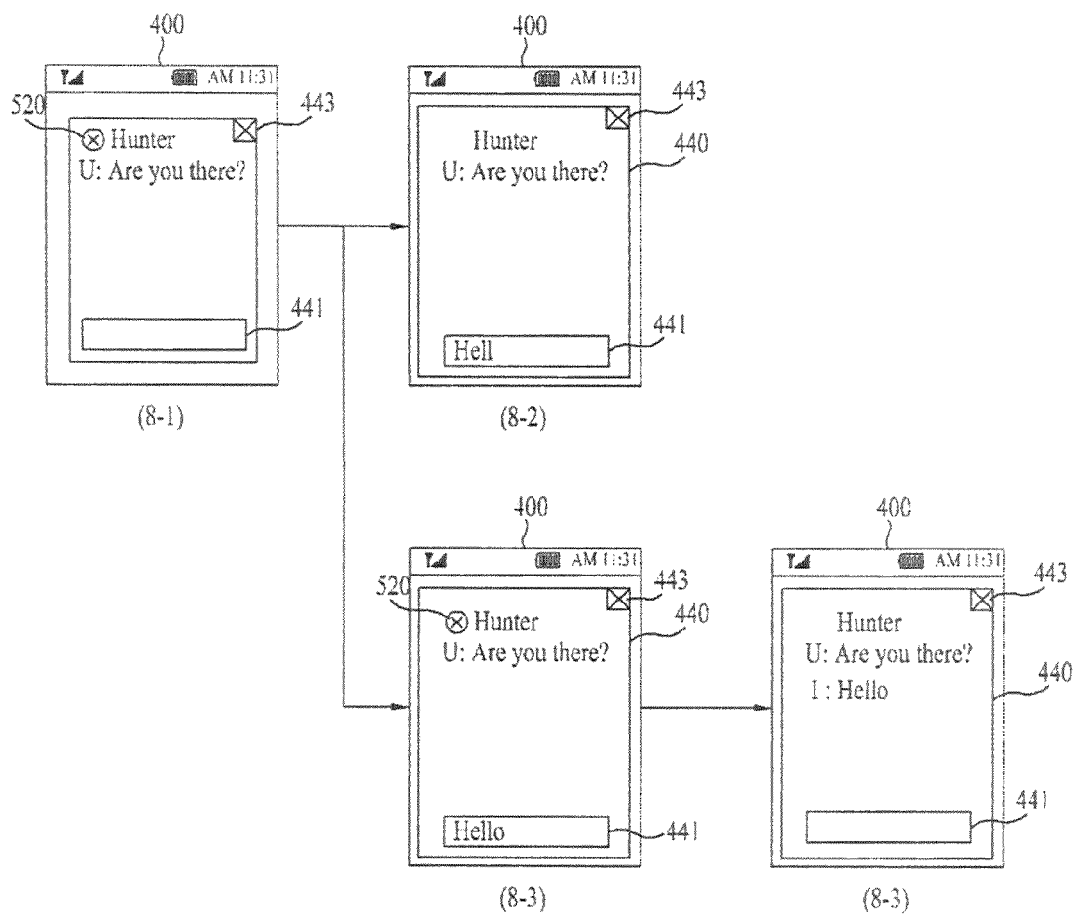

Referring to (8-1) of FIG. 8, a dialogue window 440 with a buddy is generated from the touchscreen 400. As the buddy sends an instant message to the ID user, the dialogue window 400 with the buddy is generated. This is explained in the foregoing description and its details are omitted from the following description.

If so, the ID user is able to input an instant message by manipulating the user input unit 130. Although not shown in FIG. 8, the user input unit 130 can include a software keypad displayed on the touchscreen 400.

Referring to (8-2) of FIG. 8, the inputted instant message is displayed on the text input field 441. As the instant message is inputted, the communication block setting of the buddy can be automatically released.

Meanwhile, referring to (8-3) of FIG. 8, even if the instant message is inputted by the ID user, the communication block setting for the buddy can keep being maintained. Instead, referring to (8-4) of FIG. 8, when the inputted instant message is sent to the buddy terminal, the communication block setting for the buddy can be automatically released.

In (8-2) or (8-4) of FIG. 8, exemplarily shown is that the communication block indicator 520 for the buddy is no more displayed in the dialogue window 440 as the communication block setting for the buddy is released.

Meanwhile, in FIG. 8, illustrated is that the dialogue window is generated by receiving the instant message from the buddy and that the communication block setting for the buddy is changed via the dialogue window, by which the present invention is non-limited. This is further explained with reference to FIG. 9 as follows.

Referring to (9-1) of FIG. 9, the buddy list 410 can be displayed on the touchscreen 400. This is as good as explained in the foregoing description and its details are omitted from the following description.

First of all, a communication-blocked buddy (Hunter) is touched and selected from the buddy list 410.

If so, referring to (9-2) of FIG. 9, an instant message menu window 420 for the selected buddy is displayed on the touchscreen 400.

Subsequently, a menu 'IM dialogue' is selected from the instant message menu window 420.

If so, referring to (9-3) of FIG. 9, a dialogue window 440 with the buddy is generated on the touchscreen 400. In this case, a nickname of the buddy and a communication block indicator 520 indicating that the buddy is communication-blocked are displayed in the dialogue window 440.

Referring to (9-4) of FIG. 9, a message for the buddy can be inputted via the user input unit 130. In this case, the inputted instant message is displayed in the text input field 441. As the instant message is inputted, the communication block setting for the buddy can be automatically released.

Meanwhile, referring to (9-5) of FIG. 9, even if the instant message is inputted by the ID user, the communication block setting for the buddy can keep being maintained. Instead, referring to (9-6) of FIG. 9, when the inputted instant message is sent to the buddy terminal, the communication block setting for the buddy can be automatically released.

In (9-2) or (9-4) of FIG. 9, exemplarily shown is that the communication block indicator 520 for the buddy is no more displayed in the dialogue window 440 as the communication block setting for the buddy is released.

How to set a communication block or grant for at least one portion of buddies in the buddy list according to a location of the mobile terminal is explained with reference to FIG. 10 as follows.

First of all, assume that the mobile terminal 100 is located at a preset first location (e.g., home).

When the mobile terminal 100 is present at the preset first location, the ID user logs in to the instant message server 200.

Figure 10:
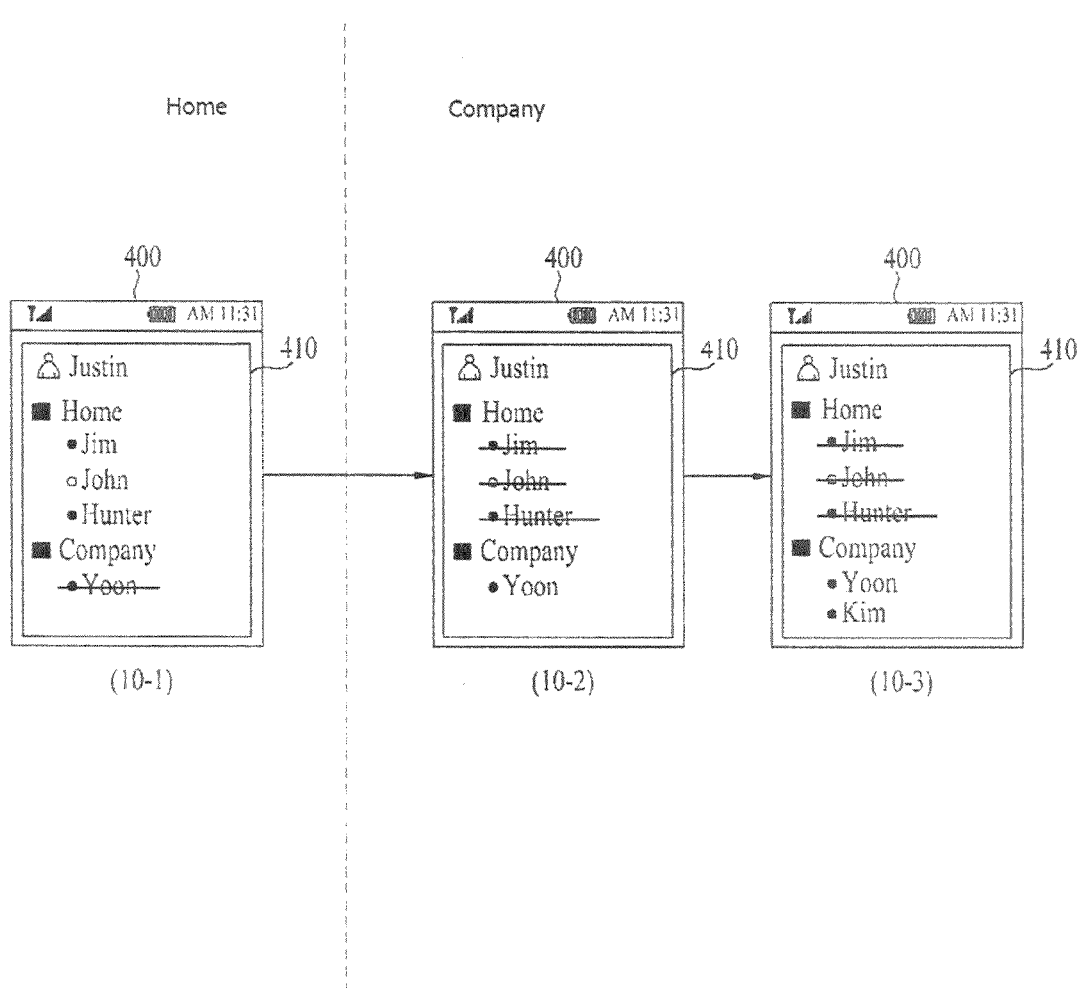

If so, referring to (10-1) of FIG. 10, the buddy list 410 can be displayed on the touchscreen 400.

In the first place, the buddy list 410 is described as follows. In the buddy list 410, a first group (Home) and a second group (Company) are exemplarily included. A process for generating a group for grouping at least one portion of the buddies in the buddy list 410 after the mobile terminal 100 logs in to the instant message server 200 is apparent to those skilled in the art. And, its details are omitted from the following description for clarity of this disclosure.

The first group can include a group generated when the mobile terminal 100 is present at the first location. Using the position location module 115, the controller 180 of the mobile terminal 100 recognizes the location of the mobile terminal 100 is the first location when the first group is generated. The controller 180 is then able to control the information on the first location to be stored in the memory 160 of the mobile terminal 100 or the instant message server 200.

After the first group has been generated, at least one portion of the buddies in the buddy list can move into the first group. For instance, a buddy failing to belong to the group or a buddy belonging to another group is touched and then dragged to the first group so that the dragged buddy can move to the first group [not shown in the drawing]. This is apparent to those skilled in the art and its details are omitted from the following description for clarity of this disclosure.

On the other hand, the second group is the group generated when the mobile terminal 100 is present at the second location. The information on the second location can be stored in the memory 160 of the mobile terminal 100 or the instant message server 200 to correspond to the second group. After the second group has been generated, at least one portion of the buddies in the buddy list can move to the second group. This is apparent to those skilled in the art and its details are omitted from the following description for clarity of this disclosure.

As mentioned in the foregoing description, when the mobile terminal 100 is present at the preset first location, if the ID user logs in to the instant message server 200, the controller 180 is able to recognize that a current location is the first location via the position location module 115. Subsequently, referring to (10-1) of FIG. 10, the controller 180 automatically sets communication grant to the buddies of the first group corresponding to the first location and also sets communication block for the buddies of the second group corresponding to another location (i.e., second location) except the first location, in the buddy list 410.

Even if the communication grant is set for all buddies of the first group at the first location, it is a matter of course that the communication block can be individually set each of the buddies of the first group by the aforesaid process described with reference to (5-2) and (5-3) of FIG. 5.

Even though the mobile terminal has moved away from the first location and the mobile terminal returns to the first location such that the buddies of the first group can be communication-granted, the individually communication-blocked buddy may still remain communication-blocked. Alternatively, if the mobile terminal has moved away from the first location and the mobile terminal returns to the first location such that buddies of the first group can be communication-granted, the individually communication-blocked buddy can be communication-granted.

Subsequently, the mobile terminal 100 is able to move away from the first location (Home) into the second location (Company).

If so, the controller 180 is able to recognize that a current location of the mobile terminal 100 is the second location via the position location module 115. Subsequently, referring to (10-2) of FIG. 10, the controller 180 automatically sets communication grant to the buddies of the second group corresponding to the second location and also sets communication block for the buddies of the first group corresponding to another location (i.e., first location) except the second location, in the buddy list 410.

When the mobile terminal 100 is present at the second location, a new buddy (Kim) can be added to the buddy list. This procedure for adding the new buddy is apparent to those skilled in the art and its details are omitted from the following description for clarity of this disclosure.

If so, referring to (10-3) of FIG. 10, the controller 180 is able to control the new buddy to belong as a default to the second group in consideration of the current location of the mobile terminal 100, i.e., the current location.

Optionally, it is apparent to those skilled in the art that the new buddy can move into the first group in a manner of being touched and then dragged to the first group from the second group [not shown in the drawing].

In the following description, how to automatically set communication block or communication grant for at least one portion of buddies in the buddy list according to a preset schedule in the mobile terminal is explained with reference to FIG. 11.

First of all, the mobile terminal 100 enters a schedule menu for setting a new schedule. In this case, the schedule menu is a general menu for the mobile terminal 100 to inform a terminal user, if a schedule is set at the mobile terminal 100, that the schedule exists at a time corresponding to the set schedule, via alarm or the like. This procedure for entering the schedule menu by a terminal user's manipulation of the user input unit 130 in the mobile terminal 100 is apparent to those skilled in the art and its details are omitted from the following description for clarity of this disclosure.

Figure 11:
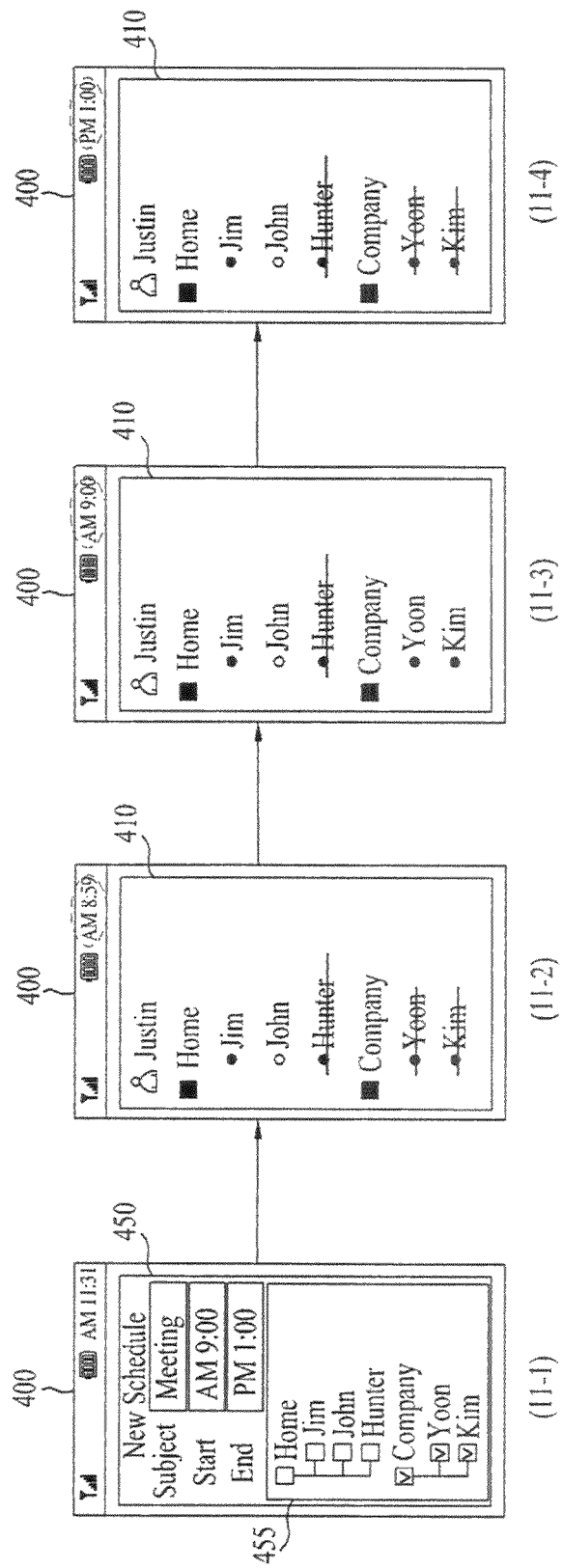

Once the mobile terminal 100 enters the schedule menu, referring to (11-1) of FIG. 11, a schedule setting window 450 is displayed on the touchscreen 400.

It is then able to input a title, start time and end time of the new schedule to the schedule setting window 450. Buddies in the buddy list 455 are displayed on the schedule setting window 450. And, it is able to select a buddy and/or group related to the schedule in advance. In (11-1) of FIG. 11, exemplarily shown is that a second group (Company) is selected in association with the schedule.

Once the new schedule setting is completed, referring to (11-2) of FIG. 11, the controller 180 is able to control the communication block to be set at the buddies belonging to the second group in the list prior to the start time of the schedule.

The controller 180 obtains a current time by accessing an external network (e.g., mobile communication network) via the wireless communication unit 110.

If it is the start time of the schedule, referring to (11-3) of FIG. 11, the controller 180 is able to control the buddies belonging to the second group in the list to be released from the communication block.

Subsequently, if it is the end time of the schedule, referring to (11-4) of FIG. 11, the controller 180 is able to control the communication block to be set at all the buddies belonging to the second group in the list again.

In FIG. 11, illustrated is that the communication grant is set at the previously selected buddies between the start and end times of the schedule (i.e., communication block release setting) and that the communication block is set for other times, by which the present invention is non-limited. For instance, the previously selected buddies are communication-blocked between the start and end times of the schedule but the communication block release can be set for other time.

In the following description with reference to FIG. 12, a prescribed rule can be preset for the instant message communication in the mobile terminal 100. And, a prescribed function can be performed for the instant message communication according to the preset rule.

Referring to (12-1) of FIG. 12, it is able to display the buddy list 410 on the touchscreen 400.

Subsequently, referring to (12-2) of FIG. 12, it is able to display an instant message menu window 460 for the ID user. For instance, it is able to display the instant message menu window 460 in a manner of touching a nickname (Justin) of the ID user in the buddy list 410.

In the menu window 420, exemplarily displayed are menus including 'Change nickname', 'Add rule', 'View rule' and the like, by which the present invention is non-limited.

The menu 'Change nickname' is provided to change the nickname of the ID user. The menu 'Add rule' is provided to set a new rule. And, the menu 'View rule' is provided to view at least one rule that was previously set.

Subsequently, the menu 'Add rule' is touched and selected.

If so, referring to (12-3) of FIG. 12, a display for selecting a subject of the new rule can be displayed on the touchscreen 400. In (12-3) of FIG. 12, exemplarily shown is that a buddy having the nickname 'John' is selected as the subject of the rule.

Subsequently, referring to (12-4) of FIG. 12, a display for selecting a condition for enabling the rule to be executed can be displayed on the touchscreen 400. In (12-4) of FIG. 12, exemplarily shown is that the condition includes 'when log in', 'when log out' or 'when changes status' (non-limited) and that the 'when log in' is selected.

Referring to (12-5) of FIG. 12, a display for selecting a function executed according to the new rule can be displayed on the touchscreen 400. In (12-5) of FIG. 12, exemplarily shown is that the function includes 'Set me (ID user) as offline', 'Start IM', 'Call' or 'Change my status' (non-limited) and that the 'Start IM' is selected.

After completion of the setting, assume that there takes place a situation that the preset buddy logs in.

If so, the situation that the preset buddy has logged in can be informed to the mobile terminal 100 via the instant message server 200.

If so, referring to (12-6) of FIG. 12, the controller 180 controls a dialogue window 440 for performing the instant message communication with the preset buddy to be automatically displayed on the touchscreen 400.

Except the condition 'when log in' and the function 'Start IM', the rest of the conditions and functions are apparent to those skilled in the art to which the present invention pertains and details are omitted from the following description for clarity of this disclosure.

Accordingly, the present invention provides the following effects and/or advantages.

First of all, according to at least one of embodiments of the present invention, even if a user does not set a communication grant or block per a buddy in a buddy list in advance, it is able to effectively prevent a request for initiating an instant message communication with the user from being made by an unwanted buddy.

Secondly, once one buddy is communication-blocked, it is able to receive an instant message from the communication-blocked buddy even before the communication block is released.

It will be apparent to those skilled in the art that various modifications and variations can be specified into other form(s) without departing from the spirit or scope of the inventions.

In addition, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a display unit;
   a wireless communication unit for an instant message communication; and
   a controller having first and second communication block release modes, wherein the controller is configured to:
   when a user having a prescribed ID logs in to an instant message server, control a pre-registered buddy list from the instant message server to be received and displayed on the display unit, set a communication block for a first buddy in the buddy list not to inform the first buddy that the user having the prescribed ID has logged in, set a communication grant for a second buddy in the buddy list to inform the second buddy that the user having the prescribed ID has logged in, control the display unit to display a dialogue window for the instant message communication with the first buddy who is listed but blocked in the buddy list, control an instant message to be received from the first buddy or transmitted to the first buddy despite that the communication block has been set for the first buddy, wherein when the controller is in the first communication block release mode, the instant message to be transmitted to the first buddy is written in the dialogue window, and the written message is not yet sent to the first buddy, the controller controls the communication block setting for the first buddy to be automatically changed into the communication grant setting, and wherein when the controller is in the second communication block release mode and the written instant message is sent to the first buddy, the controller controls the communication block setting for the first buddy to be automatically changed into the communication grant setting.

2. The mobile terminal of claim 1, wherein the display unit comprises a touchscreen and wherein if a prescribed icon in the dialogue window is touched, the controller controls the communication block setting for the first buddy to be changed into the communication grant setting.

3. The mobile of claim 2, wherein the controller controls an announcement indicating that the setting is changeable if the prescribed icon is touched to be displayed in the dialogue window.

4. The mobile terminal of claim 1, wherein if the instant message communication with the first buddy is initiated by an instant message reception from the first buddy, the controller controls the dialogue window to be displayed on the display unit.

5. The mobile terminal of claim 1, wherein the controller controls an indicator indicating whether to block a communication with the first buddy to be displayed in the dialogue window.

6. The mobile terminal of claim 1, wherein the controller controls nicknames of the user having the prescribed ID to be set different from each other for the communication-blocked first buddy and the communication-granted second buddy, respectively.

7. The mobile terminal of claim 1, wherein the first buddy belongs to a first group in the buddy list and wherein the second buddy belongs to a second group in the buddy list.

8. The mobile terminal of claim 7, further comprising a position location module configured to obtain a current location, wherein if the current location is a preset first location, the controller controls the communication grant to be automatically set for entire buddies belonging to the second group and also controls the communication block to be set for entire buddies belonging to the first group.

9. The mobile terminal of claim 8, wherein when the current location is the first location, if a new buddy is registered with the buddy list, the controller controls the new buddy to automatically belong to the second group.

10. The mobile terminal of claim 8, wherein if the current location is changed into a preset second location, the controller controls the communication grant to be automatically set for the entire buddies belonging to the first group and also controls the communication block to be set for the entire buddies belonging to the second group.

11. The mobile terminal of claim 10, wherein when the current location is the second location, if the new buddy is registered with the buddy list, the controller controls the new buddy to automatically belong to the first group.

12. The mobile terminal of claim 7, wherein the wireless communication unit accesses an external network and then receives current time information and wherein if the current time is a preset first time, the controller controls the communication block to be newly set for the entire buddies belonging to the previously communication-granted second group or controls the communication grant to be newly set for the entire buddies belonging to the previously communication-blocked first group.

13. The mobile terminal of claim 12, wherein if the current time is a preset second time, the controller controls the communication grant to be set again for the entire buddies belonging to the second group or controls the communication block to be set again for the entire buddies belonging to the first group.

14. A method of controlling a mobile terminal, comprising:
when a user having a prescribed ID logs in to an instant message server, receiving and displaying a pre-registered buddy list from the instant message server;
setting a communication block for a first buddy in the buddy list not to inform the first buddy that the user having the prescribed ID has logged in;
setting a communication grant for a second buddy in the buddy list to inform the second buddy that the user having the prescribed ID has logged in;
displaying, on a display unit of the mobile terminal, a dialogue window for an instant message communication with the first buddy who is listed but blocked in the buddy list; and
receiving an instant message from the first buddy or transmitting an instant message to the first buddy despite that the communication block has been set for the first buddy,
wherein when a controller is in a first communication block release mode, the instant message to be transmitted to the first buddy is written in a dialogue window, and the written message is not yet sent to the first buddy, the controller controls the communication block setting for the first buddy to be automatically changed into the communication grant setting, and
wherein when the controller is in the second communication block release mode and the written instant message is sent to the first buddy, the controller controls the communication block setting for the first buddy to be automatically changed into the communication grant setting.

15. The mobile terminal of claim 1, wherein the controller controls a condition to be preset for each of the first and second buddies to execute a specific function when the present condition is satisfied.

16. The method of claim 14, further comprising controlling a condition to be preset for each of the first and second buddies to execute a specific function when the present condition is satisfied.

17. The method of claim 14, wherein the first buddy belongs to a first group in the buddy list and wherein the second buddy belongs to a second group in the buddy list.

18. The method of claim 17, further comprising:
obtaining a current location; and
if the current location is a preset first location, automatically setting the communication grant for entire buddies belonging to the second group, and also setting the communication block for entire buddies belonging to the first group.

19. The method of claim 18, further comprising when the current location is the first location, if a new buddy is registered with the buddy list, controlling the new buddy to automatically belong to the second group.

20. The method of claim 18, further comprising if the current location is changed into a preset second location, automatically setting the communication grant for the entire buddies belonging to the first group, and also setting the communication block for the entire buddies belonging to the second group.

\* \* \* \* \*